No. 859,623. PATENTED JULY 9, 1907.
A. R. SMITH.
STEAM COOKER.
APPLICATION FILED APR. 18, 1906.

2 SHEETS—SHEET 1.

Witnesses

Inventor
Alice R. Smith.
By
Attorneys

No. 859,623. PATENTED JULY 9, 1907.
A. R. SMITH.
STEAM COOKER.
APPLICATION FILED APR. 18, 1906.

2 SHEETS—SHEET 2.

Witnesses
J. C. Simpson
H. B. MacNab

Inventor
Alice R. Smith.
By
Attorneys

UNITED STATES PATENT OFFICE.

ALICE R. SMITH, OF GALESBURG, ILLINOIS.

STEAM-COOKER.

No. 859,623.

Specification of Letters Patent.

Patented July 9, 1907.

Application filed April 18, 1906. Serial No. 312,466.

*To all whom it may concern:*

Be it known that I, ALICE R. SMITH, a citizen of the United States, residing at Galesburg, in the county of Knox, State of Illinois, have invented certain new and useful Improvements in Steam-Cookers; and I do hereby declare the following to be a full, clear, and exact description of the invention, such as will enable others skilled in the art to which it appertains to make and use the same.

This invention has relation to steam cookers that are adapted to contain trays and dishes of various form and capacity so as to suit the cooker to various uses.

It is the object of the invention to provide a steam cooker that can be used with great convenience in cooking various dishes at the same time without danger of having the contents of one or more dishes commingle with another or others; and in which water may be supplied to the cooker while the operation of cooking is going on.

It is also the object of the invention to provide a cooker or steamer in which particular trays or dishes may be supplied or removed while the work of cooking is going on, enabling a part of the stewing, boiling, baking or other cooking to be done separately and then supplied to the main cooker and finished, and vice versa.

Numerous other objects are had in view as will clearly appear hereinafter, reference being had to the annexed drawings and figures of reference marked thereon, forming a part of this invention.

Figure 1:
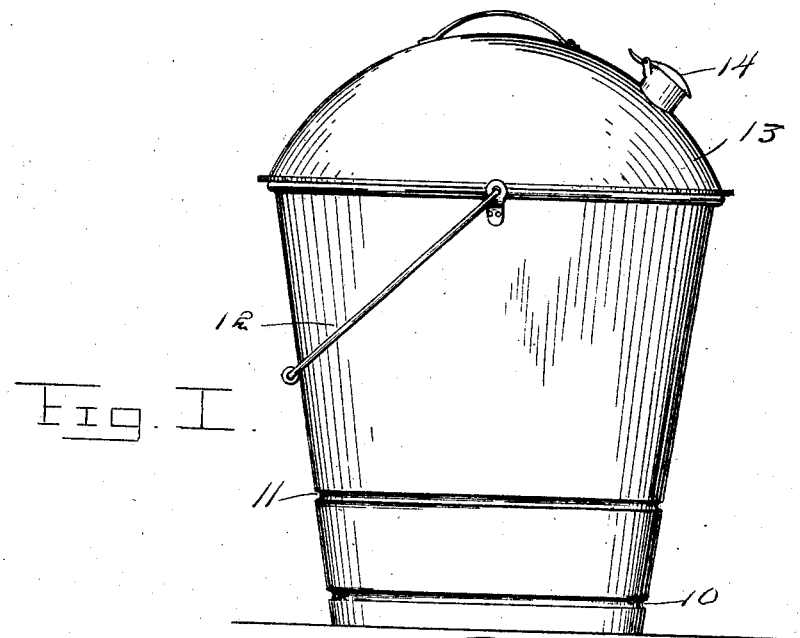
Figure 2:
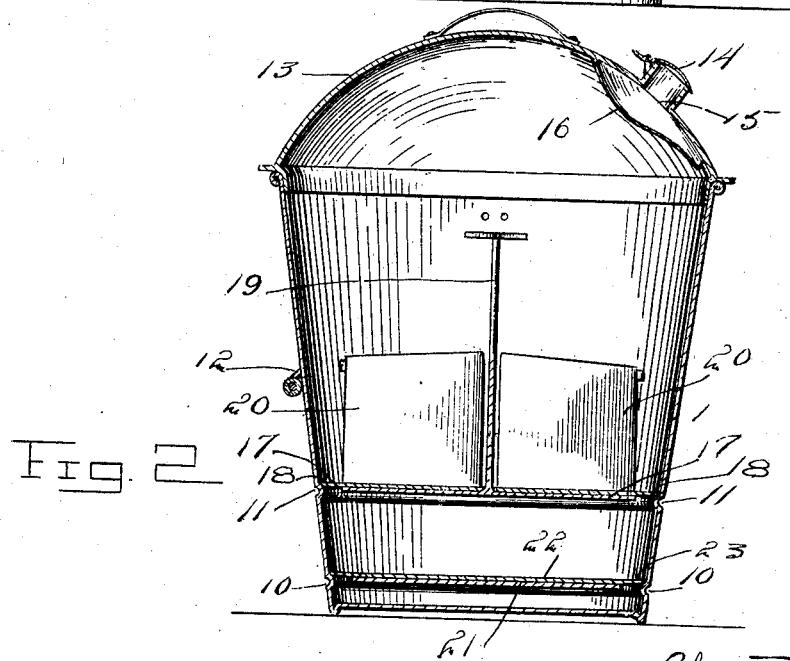
Figure 3:
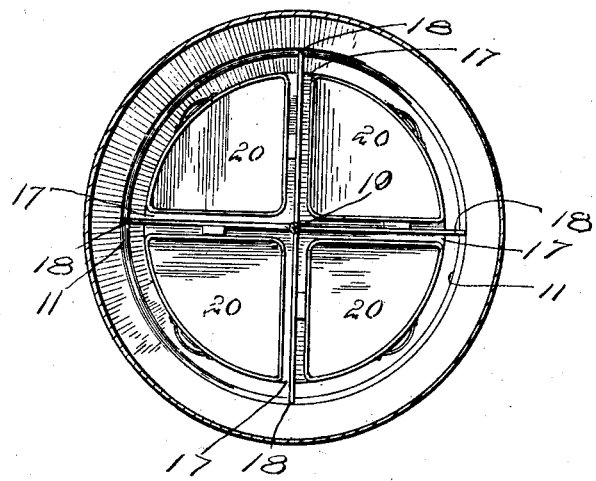
Figure 4:
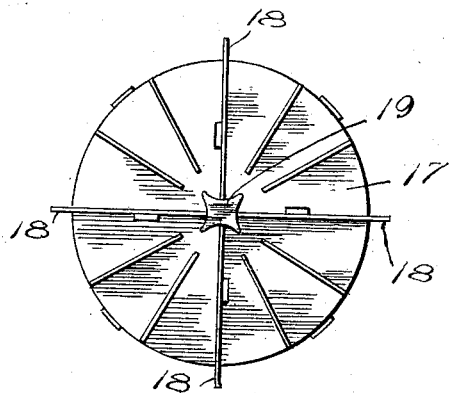
Figure 5:
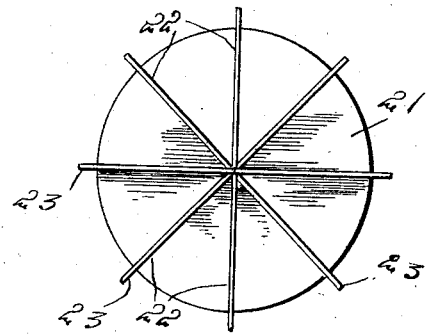

Of the drawings, Figure 1 is a side elevation of the improved cooker in one of the forms in which it may be embodied. Fig. 2 is a vertical central section thereof. Fig. 3 is a transverse section through the cooker. Fig. 4 is a plan view of one of the trays. Fig. 5 is a plan view of the other tray.

In carrying out the invention it is proposed to make the main cooking vessel substantially round and tapering inwardly from top to bottom. The main part or vessel, as well as the trays and dishes used, may be enameled inside and blued outside.

As indicating a convenient or standard size, it may be said that it is proposed to make the cooker or steamer about ten inches high, thirteen inches in diameter at the top and eleven inches in diameter at the bottom. Two inwardly extended annular beads 10 and 11 are shown as formed or impressed in the sides of the pail for supporting trays—one, 10, one-half inch from the bottom and the other, 11, five and three-fourths inches from the bottom. Another or other similar beads may be made in the vessel if thought necessary or desirable.

The cooker is provided with a bail 12 as shown.

The measurements hereinbefore given are not absolute, but may be varied if desired.

The cooker may be provided with a loose flat cover (not shown) simply to keep out dust etc. after or before the contents are cooked or are in the process of cooking. A regular dome-shaped cover 13 is, however, provided for use during the process of cooking or before and after said process. The said dome-shaped cover is provided with a self-operating or regulating valve 14 pivoted at its upper edge to the cover 13 and an opening 15 at the edge of the cover with a trough-like guide 16 leading to it from a point on the upper part of the cover; or the guide which may be tubular in form for part of its length is provided on the steamer cover for replenishing the same with water and guiding the water to the side of the cooker so that it shall add to or commingle with the cooking water already in the vessel, and not accidentally get into the chambers between the trays.

The upper tray 17 may be made flat with certain bars or risers 18 extending beyond the periphery of the tray and resting on the tapering sides of the vessel, or it may be a bead provided for the purpose. This latter tray is provided on its upper side with several small enameled bars resting on their edges for the support of baking dishes, and higher bars may be provided back of and between the regular supporting bars. A strong flat-top handle 19 is arranged at the center and rises above the dishes that may be placed on the tray so that the latter can be readily lifted up and carried away. Baking dishes 20 approaching the form of a quadrant, a little higher at the back than at the sides, as shown in Fig. 2, may be provided for use on this and other trays, though these are merely a convenience, especially for the smaller dishes, and not a necessity.

Where but two trays are used, the tray just described and designated 17 may have its radial supporting bars 18 rest upon the upper annular bead formed five and three-fourths inches from the bottom of the cooker. This will provide for the use of high dishes on the tray and the full and free circulation of steam around the same, it being observed that the peripheries of the trays do not extend to the side of the vessel.

21 designates an annular tray provided with numerous radial risers 22 or dish supports on its upper face, which supports consist of flat bars supported on edge, as shown, the ends 23 of which extend beyond the periphery of the tray and rest on the lower annular bead 10. The risers 22 of the tray 21, like the risers or bars on other trays will keep boiling meats and vegetables up a little from the bottom of the cooker in order to prevent scorching and to allow boiling water to circulate freely under the cooking food.

As stated, the enameled baking dishes may be somewhat near the form of a quadrant. What might be the form of a triangle or quadrant is preferably blunted or cut off and the said dishes may have flat rings for lifting them and carrying them about.

This steamer provides a superior utensil for housewives in many ways. It may when divested of its trays and dishes be used as a convenient milk and water pail; by using substantially the same form of enameled dishes it will be found very convenient in preserving fruits. As a steamer it is excellent in boiling meats and vegetables and steaming all kinds of pastry. The utensil is especially suited to the cooking of food for camping parties, prospectors, miners, etc.

What is claimed as new is:—

1. A steam-cooker consisting of a substantially round sheet-metal body, tapering inwardly from top to bottom, having a plurality of inwardly-projecting annular beads, combined with circular trays of less diameter than the body leaving a space between the edge of the trays and the body, said trays being provided on their upper sides with radially arranged bars or risers, certain of which extend beyond the peripheries of said trays and rest at their said extended ends on the said beads, the other risers extending only to the periphery of the trays.

2. A steam-cooker consisting of a substantially round sheet-metal body, tapering inwardly from top to bottom, having a plurality of inwardly-projecting annular beads, combined with circular trays of less diameter than the body leaving a space between the edge of the trays and the body, said trays being provided on their upper sides with radially arranged bars or risers, extending beyond the peripheries of said trays and resting at their said extended ends on the said beads, the other risers extending only to the periphery of the trays and an upwardly extended handle connected with the center of the trays.

In testimony whereof, I affix my signature, in presence of two witnesses.

ALICE R. SMITH.

Witnesses:
FLETCHER CARNEY,
W. C. FRANK.